June 29, 1965 LE ROY R. KELMAN ET AL 3,192,122
FUEL ELEMENT FOR A NUCLEAR REACTOR HAVING STACK OF
THIN FUEL WAFERS SUBMERGED IN LIQUID METAL
Filed March 9, 1964
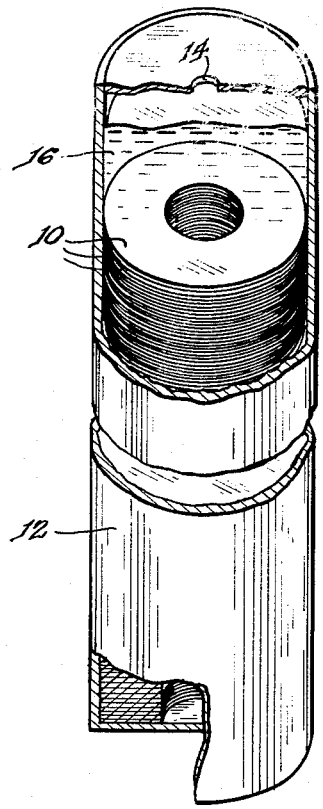
INVENTORS
LeRoy R. Kelman
Owen L. Kruger
BY
Roland A. Anderson
Attorney 3,192,122
FUEL ELEMENT FOR A NUCLEAR REACTOR HAVING STACK OF THIN FUEL WAFERS SUBMERGED IN LIQUID METAL
Le Roy R. Kelman, Naperville, and Owen L. Kruger, Westmont, Ill., assignors to the United States of America as represented by the United States Atomic Energy Commission
Filed Mar. 9, 1964, Ser. No. 350,623
3 Claims. (Cl. 176—72)

This invention relates to a fuel element for a nuclear reactor. In more detail the invention relates to a fuel element for a liquid-metal-cooled power reactor wherein the fuel consists of metallic uranium enriched with a fissionable isotope such as U–235, U–233 or Pu–239.

When uranium or a uranium-plutonium alloy is irradiated in a nuclear reactor, the formation of gaseous fission products in the material causes it to swell. At first the swelling is gradual as the temperature is increased but eventually the "breakaway swelling temperature" of the material is reached at which temperature the swelling increases so much that the cladding on the material might no longer be able to withstand the pressure and might be ruptured. This prevents the free flow of coolant past the fuel element and permits fission products to escape to the coolant.

It has been believed that metallic uranium and alloys of uranium and plutonium could not be used in liquid-metal-cooled power reactors because such reactors must be operated at above the breakaway swelling temperature of uranium and uranium-plutonium alloys to attain a reasonable degree of efficiency. It has accordingly been thought that large alloy additions to the fuel would be necessary to develop a material which does not swell excessively, or that compounds of uranium and plutonium such as uranium dioxide and plutonium dioxide would have to be employed.

Large alloy additions to the fuel are undesirable because the addition of absorber in the form of an alloying metal requires an increase in the amount of fissionable isotope in the reactor. The amount and kind of such additions that can be made are severely limited by the overriding requirement for economy in a power plant which is to be competitive with plants employing conventional fuels. Use of compounds such as uranium dioxide and plutonium dioxide is also disadvantageous because of the low fissionable isotope density of such fuels and the concomitant increase in the amount of fuel necessary.

It is accordingly the object of the present invention to develop a fuel element for a liquid-metal-cooled power reactor incorporating metallic uranium which can be operated at temperatures considerably in excess of 400° C.

This and other objects of the present invention are attained by a fuel element wherein the fuel consists of very thin wafers of metallic uranium or of an alloy of uranium and plutonium. The thickness of these wafers is critical and must be less than six mils (0.006 inch). It is believed that the benefits of the present invention could be attained with wafers up to two or three mils (0.002–0.003 inch) thick.

The invention will next be described in connection with the accompanying drawing wherein the single figure is a diagrammatic representation of a fuel element for a nuclear reactor constructed in accordance with the present invention.

According to the present invention the fuel element contains a stack of contiguous, very thin wafers 10 of a material fissionable by neutrons of thermal energy such as uranium–238 enriched with uranium–235 or plutonium–239 disposed within a casing or cladding 12 of a nuclearly and thermally acceptable structural material such as stainless steel, zirconium, niobium, vanadium, and alloys of these elements. Casing 12 has a small hole 14 at the top thereof to act as a fission gas release and contains a body 16 of sodium which thermally bonds the fuel to the casing.

Wafers 10 are 0.144 inch in diameter, one mil (0.001 inch) thick and are composed entirely of uranium–238 enriched with 20% uranium–235. Casing 12 is 14.25 inches in length, 0.174 inch in diameter, has a wall thickness of 0.009 inch and is composed of vanadium-20% titanium alloy. While the other dimensions of the fuel element are not critical, the thickness of the wafers is critical; the wafers cannot be thicker than about two or three mils and preferably are but one mil thick.

The following experiment shows the advantages of a fuel element constructed in accordance with the present invention. One-mil and six-mil wafers were stamped from sheets of uranium–238-20 weight percent uranium–235 of this thickness. The wafers were stacked to provide a one-inch specimen length and enclosed in niobium-1 weight percent zirconium tubing which was 0.175 inch in diameter and had a wall thickness of 0.009 inch. The wafers were 0.152 inch in diameter and had an axial hole 0.056 inch in diameter extending therethrough. For comparison purposes solid pieces of fuel with identical axial holes were also enclosed in identical tubing. One of each of the three different specimens—one-mil wafers, six-mil wafers and solid specimens—were sodium bonded to the tubing and a 0.040-inch hole was drilled through the tubing in the void space above the fuel to permit fission gas release. The tubing on another three different specimens was partially cut away to serve as an open cage for the fuel.

The specimens were irradiated in a standard capsule of two tiers with three specimens to each tier in the CP–5 reactor at Argonne National Laboratory. The capsule was made from a type 304 stainless steel tube 1½ inches O.D. and 11⅜ inches long which was filled with 135 grams of eutectic NaK. A 0.010-inch thick tantalum tube encircled the specimen tiers and served as a retainer for loose fuel particles. Temperature-recording thermocouples indicated movement of the fuel after 210 Mwd. Irradiation was discontinued after 240 Mwd or a calculated 0.7 a/o burnup. The maximum fuel temperature during the irradiation was 590° C. This temperature is greater than the "breakaway swelling temperature" of uranium, however, the cladding successfully restrained the swelling. The specimens were removed from the reactor before the cladding ruptured to make metallographic examination of the specimens possible.

Of the specimens contained within open cages, swelling was pronounced in the solid specimen and in the specimen formed of six-mil wafers but was minor in the specimen formed of one-mil wafers. While the lessened amount of swelling was observed only in the caged specimens in the above-described test, the improved results also apply to clad fuel elements such as would be employed in a power reactor.

We have thus demonstrated that the amount of swelling of a fuel element formed of uranium can be reduced drastically by making the fuel element in the form of very thin wafers. It is thus possible to construct a fuel element of very thin wafers which will be more satisfactory than a solid fuel element because it can be operated at higher temperatures.

While the test was carried out on a fuel element enriched with uranium–235 for ease of handling, the results apply also to a fuel element enriched with plutonium–239. It is to such fuel elements that the invention is expected to have greatest application because the "breakaway swelling temperature" of uranium-plutonium fuels is lower than it is for uranium fuels and yet it is the uranium-plutonium fuels which are of primary interest in the fast reactor field.

It is clear from the above-described tests that one-mil wafers are satisfactory and that six-mil wafers are not. It is expected that the dividing line between satisfactory and unsatisfactory wafers is about two or three mils, the only criterion being that the wafers are thin enough to permit diffusion of fission gases to free surfaces within the fuel element. In general the wafers should be as thin as possible; therefore one-mil wafers are preferred because this is the practical minimum size they can be manufactured in quantity at a reasonable cost.

The improved result is obtained by making the fuel elements of a plurality of very thin wafers so that the fission gases can escape from the fuel. It is essential that wafers be used rather than particulate fuel (from which even better fission gas release would be expected) because of the necessity for good radial heat transfer from the fuel to the coolant as is attained with thin wafers as the fuel.

The hole in the center of the specimens was included to provide an escape route for fission gas migrating to the center of the fuel element. While this hole undoubtedly assists slightly in preventing swelling, it is not believed to be essential.

It will be understood that the invention is not to be limited to the details given herein but that it may be modified within the scope of the appended claims.

What is claimed is:

1. A fuel element for a liquid-metal-cooled nuclear reactor consisting of a stack of contiguous thin wafers of a material fissionable by neutrons of thermal energy wherein the wafers are less than six mils in thickness and thin enough to permit diffusion of fission gases to free surfaces in the element, a metal jacket having a hole in the top thereof surrounding the stack of wafers, and a liquid metal bonding agent in said jacket.

2. A fuel element according to claim 1 wherein the wafers are no greater than three mils in thickness.

3. A fuel element according to claim 2 wherein the wafers are one mil in thickness.

References Cited by the Examiner

UNITED STATES PATENTS 2,798,848  7/57  Kingdon _____ 176—37

FOREIGN PATENTS 860,561  2/61  Great Britain.

OTHER REFERENCES

Bailey, W. J. et al.: "Fabrication of Aluminum-Plutonium Fuel Element for Lattice Tests in Support of PRTR," HW–51855.

Brooks, M. et al.: "Feasibility Report for the Zero Power Mock-Up of the Dual Purpose Reactor," KAPL–257.

Etherington, H.: Nuclear Engineering Handbook, McGraw-Hill Book Co., New York, 1958, pages 12–73.

McKechnie, Robert: "Forming Uranium Dioxide Washes and Rods," TID–2501.

CARL D. QUARFORTH, *Primary Examiner*.

L. DEWAYNE RUTLEDGE, *Examiner*.